US011842934B2

(12) United States Patent
Schat

(10) Patent No.: US 11,842,934 B2
(45) Date of Patent: Dec. 12, 2023

(54) INTEGRATED CIRCUIT DEVICE DIE WITH WAFER/PACKAGE DETECTION CIRCUIT

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 1089 days.

(21) Appl. No.: 16/527,296

(22) Filed: Jul. 31, 2019

(65) Prior Publication Data

US 2021/0035923 A1    Feb. 4, 2021

(51) Int. Cl.
| H01L 23/00 | (2006.01) |
| H01L 21/66 | (2006.01) |
| G06F 21/76 | (2013.01) |
| G01R 31/28 | (2006.01) |

(52) U.S. Cl.
CPC .......... *H01L 22/34* (2013.01); *G01R 31/2856* (2013.01); *G01R 31/2865* (2013.01); *G06F 21/76* (2013.01); *H01L 23/57* (2013.01)

(58) Field of Classification Search
CPC ...... H01L 23/57; H01L 22/34; G01R 31/2856
See application file for complete search history.

(56) References Cited

U.S. PATENT DOCUMENTS 10,250,258 B2    4/2019   Jansman et al.
2019/0036706 A1   1/2019   Detert

OTHER PUBLICATIONS

Nathalie Kae-Nune et al., "Qualification and Testing Process to Implement Anti-Counterfeiting Technologies into IC Packages," 2013 Design, Automation & Test in Europe Conference & Exhibition (2013), pp. 1131-1136.
Anja Zernig et al., "Device Level Maverick Screening—Detection of Risk Devices Through Independent Component Analysis," Proceedings of the 2014 Winter Simulation Conference, pp. 2661-2670.
Guin et al., "Counterfeit Integrated Circuits: Detection, Avoidance, and the Challenges Ahead," J. Electron. Test, DOI 10.1007/s10836-013-5430-8 (2014).
Peter Samarin et al., "Detection of Counterfeit ICs Using Public Identification Sequences and Side-Channel Leakage," IEEE Transactions on Information Forensics and Security, v.14, n.3 (2019), pp. 803-813.

*Primary Examiner* — Laura M Menz
*Assistant Examiner* — Candice Chan

(57) ABSTRACT

A mechanism is provided to secure integrated circuit devices that combines a high degree of security with a low overhead, both in area and cost, thereby making it appropriate for smaller, cheaper integrated circuits. A determination is made whether a device die is on a wafer or if the device die is incorporated into a package. Only if the device die is incorporated in a package can the functional logic of device die be activated, and then only if a challenge-response query is satisfied. In some embodiments, a random number generator is used during wafer testing to form a pair of numbers, along with a die identifier, that is unique for each device die. A final test is then performed in which the device die can be activated if the device die is incorporated in a package, and the die identifier—random number pair is authenticated.

5 Claims, 7 Drawing Sheets

INTEGRATED CIRCUIT DEVICE DIE WITH WAFER/PACKAGE DETECTION CIRCUIT

BACKGROUND

Field

This disclosure relates generally to preventing and detecting integrated circuit theft and counterfeiting, and more specifically, to a challenge-response mechanism that can determine whether the integrated circuit die is in a package and perform certain tasks in response.

Related Art

Counterfeit and stolen integrated circuit dies pose a serious problem for the semiconductor industry. At least one percent of semiconductor sales globally is estimated to be counterfeit units. The source of these counterfeit units is varied and can be difficult to track. Semiconductor fabs may overproduce wafers; wafers, dies, or packaged integrated circuits may be stolen; or, wafers may be cloned. From whatever the source, these goods can then be sold on the gray market.

The risk to the semiconductor industry goes beyond the sales value of the stolen devices. In general, and especially for security- and safety-sensitive devices, poor quality of counterfeit or incompletely tested integrated circuits in products can put customers at risk and can damage the original semiconductor manufacturer's reputation.

To address these challenges to the industry, methods exist to make integrated circuits only functional after they have been enabled by a programming sequence in a final test step, and then to make sure that only genuine integrated circuits get such programming. In order to prevent counterfeiters from copying the enabling programming sequence, cryptographic challenge-response exchanges or IC-specific passwords are introduced. A cryptographic challenge-response exchange can require significant hardware and protection against side-channel attacks to the cryptographic system. Hence, such cryptographic challenge-response methods are not suitable for smaller, cheaper integrated circuits. Use of IC-specific passwords can be prone to eavesdropping and replay on cloned integrated circuits and is therefore not necessarily an effective anti-counterfeiting measure.

It is therefore desirable to have a secure mechanism for preventing or deterring theft and counterfeiting of integrated circuits that avoids the disadvantages of current cryptographic challenge-response exchanges and the risk of passwords. And at the least, the mechanism should make such theft or counterfeit detectable if they cannot be prevented.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
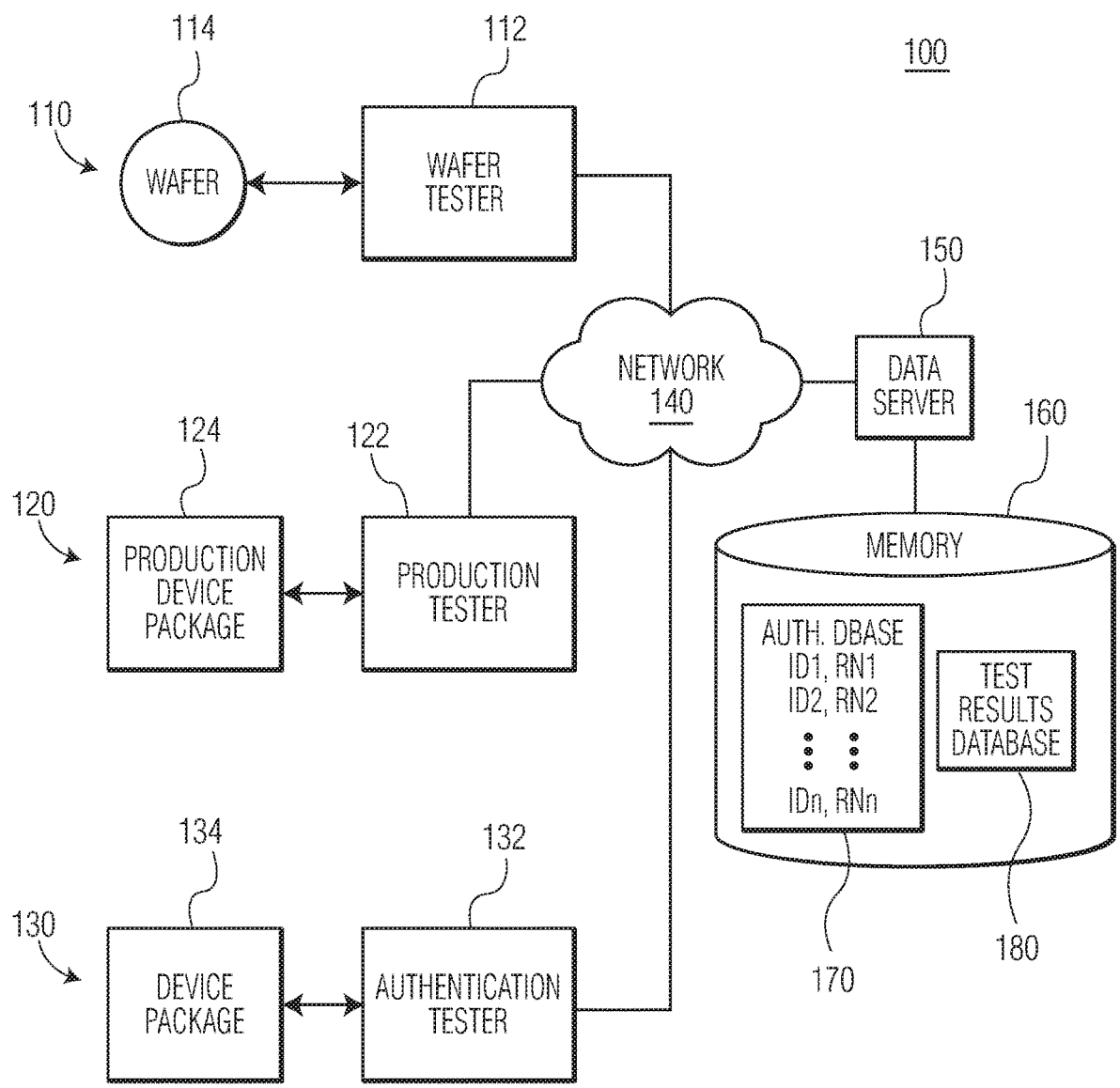
FIG. 1 is a simplified block diagram illustrating a system 100 providing device testing at various stages, along with integrated circuit device authentication, in accord with embodiments of the present invention.

Embodiments of the present invention provide a mechanism to secure integrated circuit devices that combines a high degree of security with a low overhead, both in area and cost, thereby making it appropriate for smaller, cheaper integrated circuits. A mechanism is provided to determine whether a device die is still on a wafer or if the device die is incorporated into a package. Only if the device die is incorporated in a package can the functional logic of device die be activated, and then only if a challenge-response query is satisfied. In some embodiments, a random number generator is used during wafer testing to form a pair of numbers, along with a die identifier, that is unique for each device die. A database can also be provided of all valid die identifier/generated random number for device die that have passed wafer test. A final production test is then performed in which the device die can be activated if the device die is incorporated in a package, and the die identifier/random number pair is authenticated. This combination of elements can ensure that counterfeiting, theft, and cloning is prevented with significant security and low overhead (e.g., especially avoiding the overhead of a cryptographic controller).

Securing integrated circuit device die from theft, counterfeiting, and other unauthorized use is a significant challenge to the semiconductor industry. This can be especially true for smaller, cheaper integrated circuit devices for which sophisticated cryptographic authentication methods can bring about unwanted increases in size of the device die or significantly increase the cost.

For smaller, cheaper integrated circuit devices, embodiments deter copying or theft by forcing a potential counterfeiter to perform a number of costly test and programming stages similar to those used in a genuine production test flow and introducing a risk of detection of the counterfeiter. These added expenses and risk can alter a potential counterfeiter's business case for these types of devices thereby making it non-profitable. For all integrated circuit devices, embodiments can complement existing protection for cryptographic challenge-response by providing an additional defense in the event cryptographic authentication is broken (e.g., by reverse engineering, leaking private keys from a tester, or side-channel attacks).

There are common counterfeiting scenarios in the industry addressed by the present system. In the first scenario, an assumption is made that the counterfeiter can steal the wafer test program, the final test program, and test-related information, such as die pad coordinates, in order to manufacture their own test equipment. It is further assumed that the counterfeiter can eavesdrop on communication between a device tester and the integrated circuit die during either or both of wafer testing and final product testing. But it is not likely that the counterfeiter has sufficient knowledge of the device die that the counterfeiter can alter one-time programmable (OTP) bits on the chip without using on-chip, OTP programming paths. In a second scenario, the counterfeiter steals wafers or wafer-tested dies, but those dies have not gone through final production testing (e.g. an operator may report a wafer to be broken but instead steals the wafer; an operator can steal device dies labeled for scrapping, instead of scrapping the device dies).

Integrated circuit device die undergo testing at certain stages of the production flow in order to determine whether the device is working within desired specifications. Some initial testing occurs when an integrated circuit device die is still on the wafer on which the device die is fabricated. Subsequent testing can occur after the device die have been removed, or singulated, from the wafer and are integrated within a device package.

FIG. 1 is a simplified block diagram illustrating a system 100 providing device testing at various stages, along with integrated circuit device authentication, in accord with embodiments of the present invention. FIG. 1 illustrates three main stages of testing for integrated circuit devices: wafer testing 110, production testing 120, and authentication testing 130.

During wafer testing stage 110, a wafer tester 112 receives an integrated circuit wafer 114. Wafer 114 can include a substrate, such as silicon, gallium arsenide, gallium nitride, silicon carbide, and the like, on which micro fabrication processes, such as doping, ion implantation, etching, and thin film deposition, are performed to form hundreds-to-tens-of-thousands of integrated circuit devices. Wafer tester 112 is an automated test equipment used to inspect and test integrated circuits both optically and functionally. Each individual integrated circuit on wafer 114 is tested for functional defects by applying special electronic test patterns to the integrated circuits via one or more probe contacts on the integrated circuit. Information can be stored by wafer tester 112 regarding the results of these tests for each of the die. Device die that failed to satisfy the tests are marked for discard after singulation.

During production testing 120, a production tester 112 receives a production device package 124. As with wafer testing, a variety of tests can be performed at this stage to ensure functionality of the entire package incorporating the integrated circuit die previously tested. These tests can help ensure that connections between the integrated circuit device die and other components of the package are properly completed and that all of the components work together as intended. Testing can include high-stress testing, burn-in testing, electrical characteristic testing at operational temperatures, and testing for performance at higher temperatures. Packaged devices that fail these tests are marked for discard after testing. Packaged devices that pass these tests can then be prepared for shipment to customers.

FIG. 1 also introduces authentication testing 130. As will be discussed in greater detail below, authentication testing can be performed by law enforcement, customs, customers, and the like, to determine whether an integrated circuit device die or package incorporating an integrated circuit device die is an authentic and authorized device.

Different operations are performed during wafer test and production test. In addition, embodiments of the present invention perform different security-level tasks at each of these test stages. In order to control performing of these security-level tasks, it can be important to know whether an integrated circuit device die is on a wafer or incorporated within a package. A mechanism is utilized by embodiments to determine a thickness of an integrated circuit device die and use that information to determine whether the device die is on a wafer (e.g., the device die is thicker) or incorporated within a package (e.g., the device die has been subject to wafer backgrinding, thereby making the die thinner).

Figure 2:
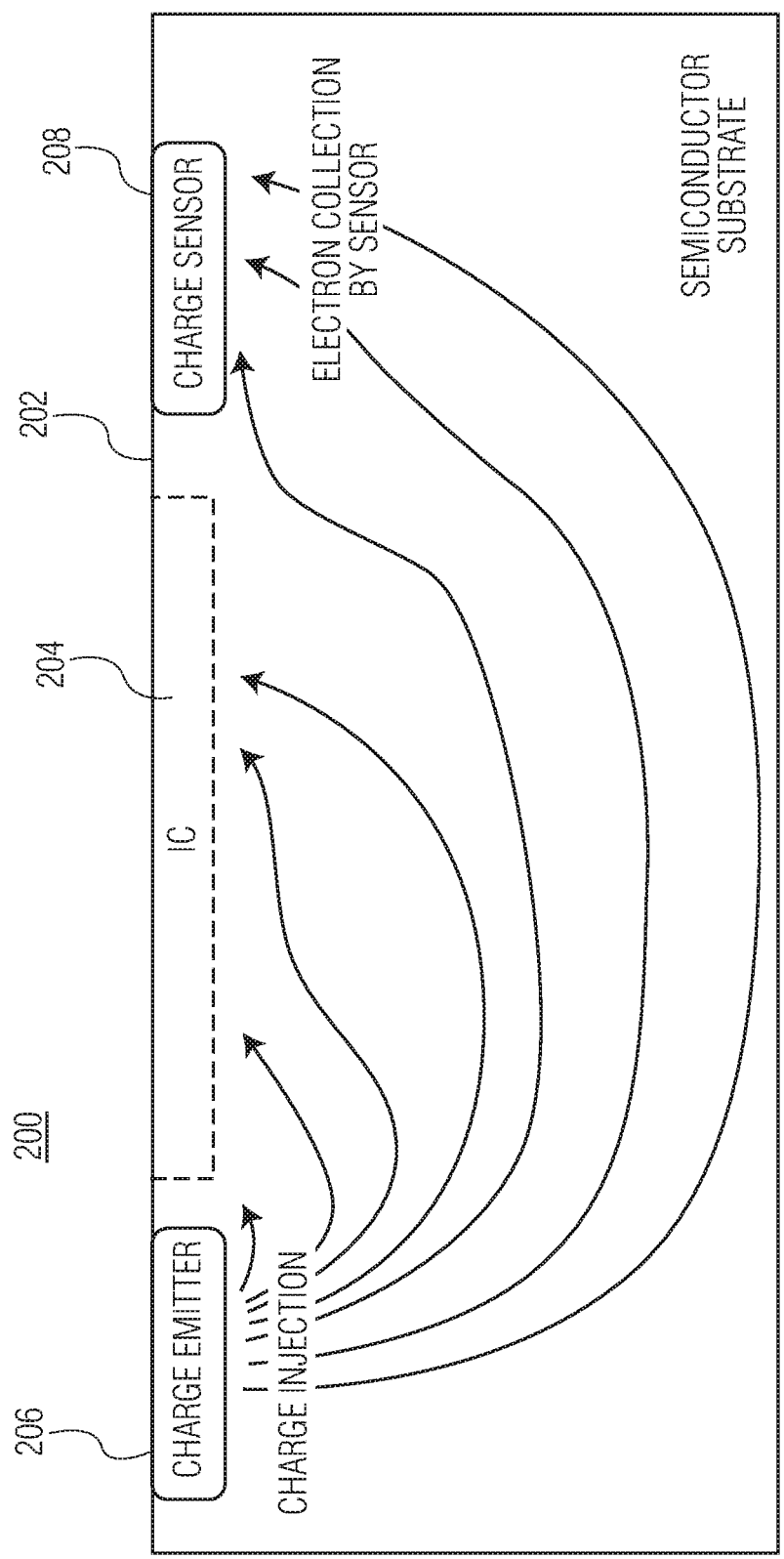
FIG. 2 is a simplified block diagram illustrating an example of an integrated circuit device 200 having substrate thickness detection capabilities usable in accord with an embodiment of the present invention.

FIG. 2 is a simplified block diagram illustrating an example of an integrated circuit device 200 having substrate thickness detection capabilities usable in accord with an embodiment of the present invention. The illustrated mechanism is provided by way of example. Embodiments of the present invention are not limited to any particular mechanism for determining thickness of a semiconductor device die. Integrated circuit device 200 includes a semiconductor substrate 202, and integrated circuit 204, a charge emitter 206, and a charge sensor 208. Although the illustrated integrated circuit device is shown with certain components and described with certain functionality, other embodiments of the integrated circuit device can include fewer or more components to implement the same, less, or more functionality.

Integrated circuit 204, charge emitter 206, and charge sensor 208 of integrated circuit device 200 are embedded in semiconductor substrate 202. Integrated circuit 204 performs designated functions of integrated circuit device 200. Charge emitter 206 is configured to produce an electric charge in the semiconductor substrate. The charge emitter can be a diode, a bipolar transistor, or other suitable electrical charge emission device. In some embodiments, charge emitter 206 is configured to emit an electrical charge into the semiconductor substrate. In some embodiments, the charge emitter is configured to generate light that is radiated into the semiconductor substrate, which causes an electrical charge to be produced in the semiconductor substrate. Charge sensor 208 is used to collect or capture at least a fraction of the electrical charge or charge carriers that are injected into the semiconductor substrate by charge emitter 206. Charge sensor 208 is configured to generate a response signal in response electrical charge produced in the semiconductor substrate. Charge sensor 208 can be a diode, a bipolar transistor, or other suitable electrical charge reception device.

Integrated circuit 204, charge emitter 206, and charge sensor 208 can be embedded in semiconductor substrate 202 during the manufacturing process. Because the charge emitter and charge sensor are embedded in the semiconductor substrate, the electrical charge produced by the charge emitter travels through the semiconductor substrate before reaching the charge sensor. A magnitude of electrical charge reaching the charge sensor, and thus the magnitude of the response signal generated by the charge sensor depends on a thickness of the semiconductor substrate. For example, generally a fraction of the electrical charge produced by the charge emitter is collected by the charge sensor. The magnitude of the produced electrical charge collected by the charge sensor depends on geometric aspects of the integrated circuit device, which includes the distance between the charge emitter and the charge sensor, the thickness of the semiconductor substrate and the size of the charge collector. Thus, the magnitude of the charge collected by the charge sensor can be used as an indicator of substrate thickness or changes in substrate thickness. Utilizing such a substrate thickness determination mechanism, one can determine whether a device die is on a wafer or within a package (i.e., device die thickness within a package will generally be less than that of the device die on the wafer, due to backgrinding operations and the like occurring during and after wafer singulation. More information regarding the above mechanism for determining substrate thickness can be found, for example, in U.S. Pat. No. 10,250,258, "Device and Method for Detecting Semiconductor Substrate Thickness," Jansman et al.

Figure 3:
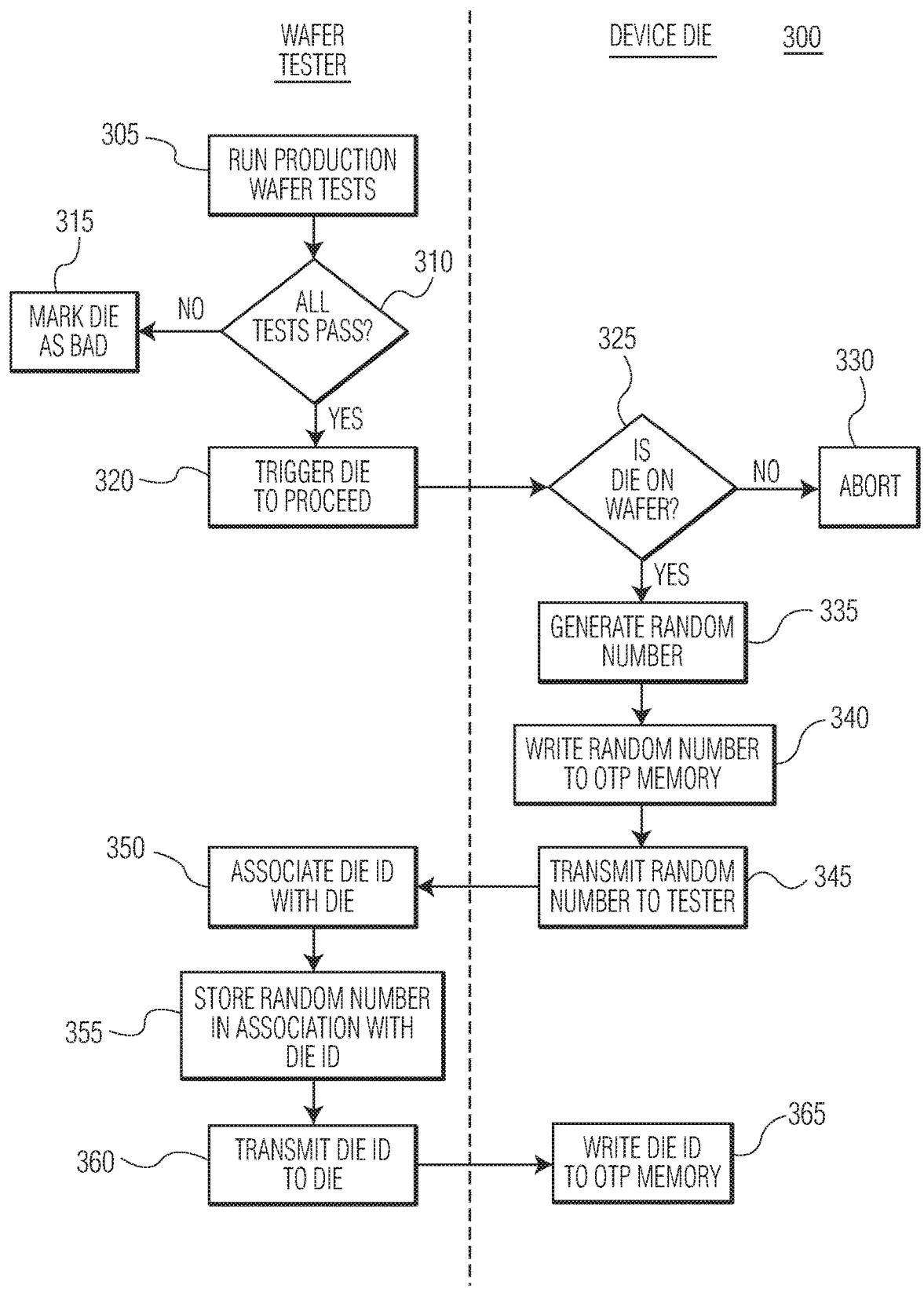
FIG. 3 is a simplified flow diagram illustrating a wafer test flow 300, in accord with an embodiment of the present invention.

FIG. 3 is a simplified flow diagram illustrating a wafer test flow 300, in accord with an embodiment of the present invention. Wafer test flow 300 incorporates functions occurring in the wafer tester (e.g., wafer tester 112) and in the device die on the wafer. As illustrated, the wafer tester executes a variety of production wafer tests (305). The wafer tester executes these tests to ensure that the functionality of the device die is within specifications. If not all tests are passed within specifications (310), then the die is marked as being bad (315), and testing continues to the next die. If all tests pass (310), then the wafer tester can trigger the device die to proceed with security operations (320).

Upon receiving the trigger from the wafer tester, a determination is made by the device die as to whether the die is on a wafer (325). As discussed above with respect to FIG. 2, in one embodiment, the thickness of the device die is determined and is indicative of whether the device die is on a wafer. If the device die is not on a wafer, then the security operation aborts (330). By aborting the security operation, this prevents a would-be counterfeiter from accessing or programming secure bits of the device die.

If the device die is on a wafer (325), then the device die can generate a true random number that will be associated with security operations (335). A hardware random number generator can be incorporated within the integrated circuit device die to generate random numbers from low-level, unpredictably random noise signals such as thermal noise, photoelectric effect, beam splitters, and other quantum phenomenon. Once the random number has been generated, the device die can write the random number to a one-time programmable (OTP) memory on the device die (340). In addition, the device die can then transmit the random number to the wafer tester (345).

The wafer tester can further associate a unique die identifier with the integrated circuit device die (350). The wafer tester can then store the received random number in association with the die identifier (355) and then transmit the die identifier to the integrated circuit device die (360). The integrated circuit device die will then write the die identifier to the OTP memory (365).

Returning to FIG. 1, wafer tester 112 can be coupled to a data server 150 via a network 140. Network 140 can be either a local area network or a wide area network within which secure communication can be provided between wafer tester 112 and data server 150. Data server 150 is coupled to a memory 160 which can store, among other things, an authorization database 170 and a test results database 180. Authorization database 170 provides entries including the device die identifiers along with the associated random numbers provided by the integrated circuit device dies. Test results database 180 can include a variety of information related to the testing by wafer tester 112 on the integrated circuit device die on wafer 114. Data server 150 can also be communicatively coupled with production tester 122 and authentication tester 132 via network 140. This gives the production tester and authentication tester access to authentication database 170 for further operations.

Figure 4:
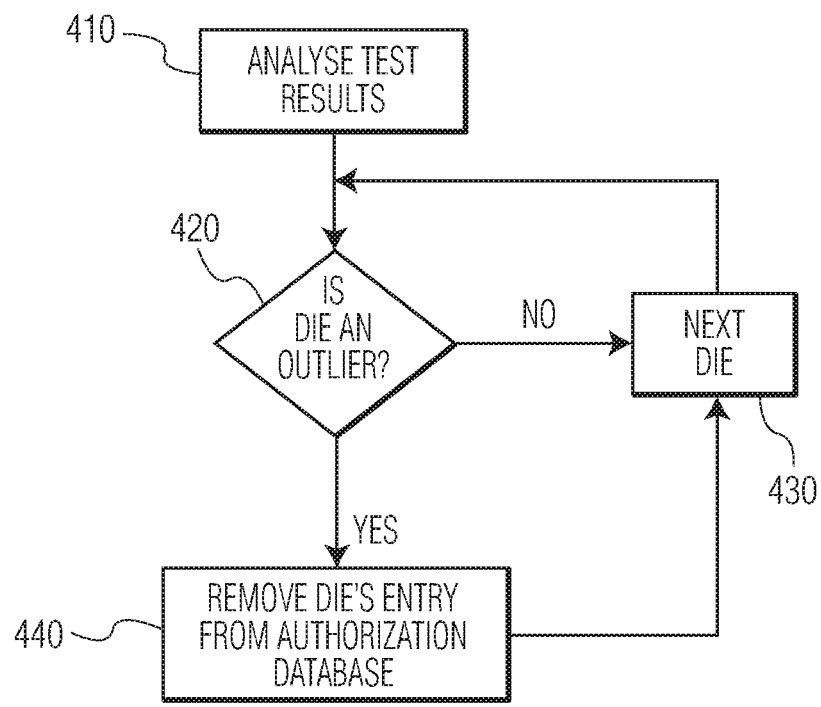
FIG. 4 is a simplified flow diagram illustrating an example of postprocessing performed on test results database 180, in accord with an embodiment of the present invention.

FIG. 4 is a simplified flow diagram illustrating an example of postprocessing performed on test results database 180, in accord with an embodiment of the present invention. An analysis is performed on the test results database (410), in order to determine whether there are any integrated circuit device die that may have certain parameters associated with them indicative of potential failing devices. For example, post processing can be applied to screen out so-called good dies in bad neighborhoods, where the individual die pass all tests but are surrounded by several defective device dies and are hence suspected to have a higher rate of latent defects associated with a higher failure rate in the field. Such device dies should be discarded, and the information related to those device dies in the authentication database should be deleted, thereby preventing someone from taking a discarded device die and passing it off as a good die (e.g. counterfeiting).

If the test results indicate that a device die is an outlier (420), then that die's entry is removed from the authorization database (440). If the device die is not an outlier (420), then a next die is selected and the test results are analyzed (430).

Figure 5:
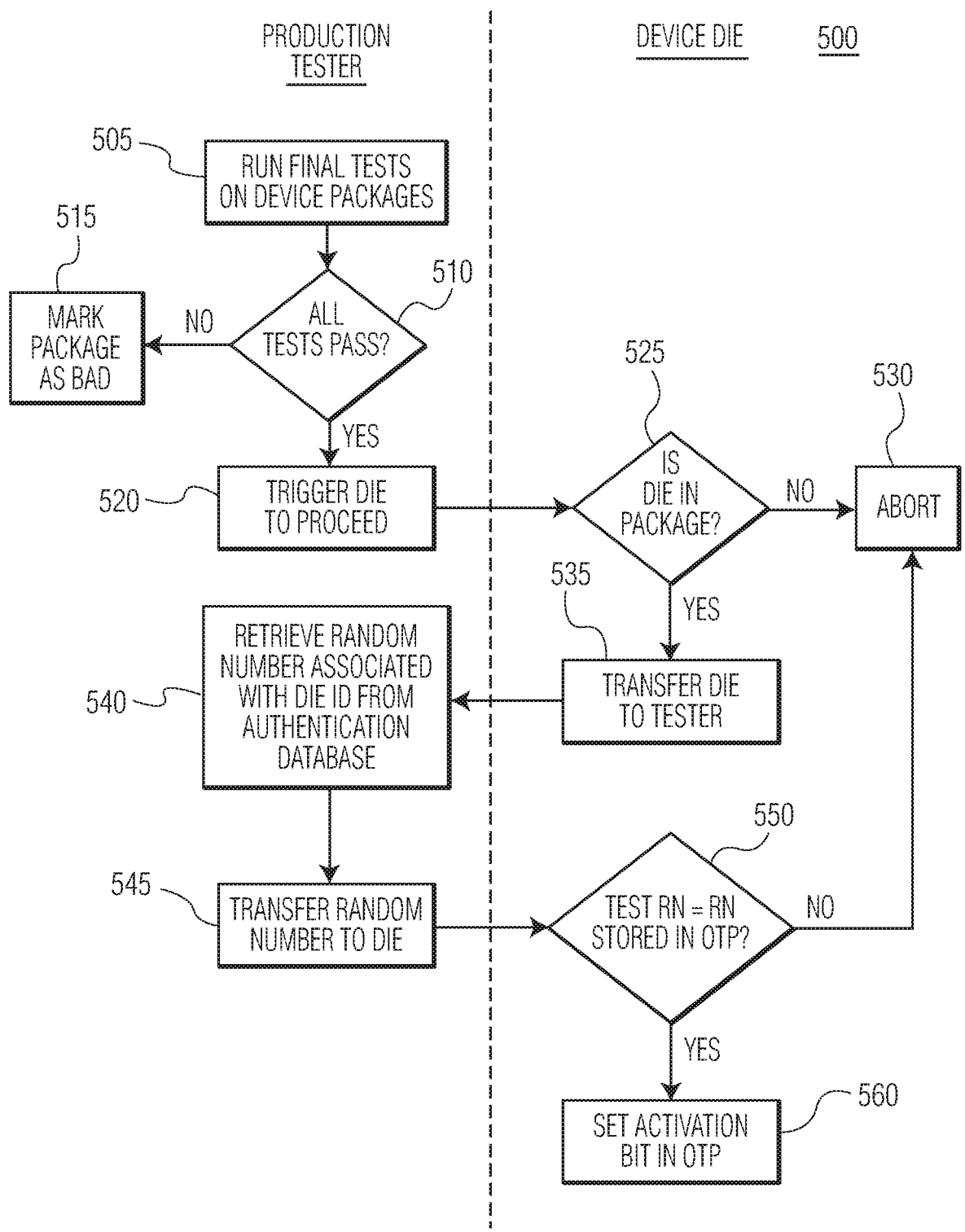
FIG. 5 is a simplified flow diagram illustrating a device package production final test flow 500, in accord with an embodiment of the present invention.

FIG. 5 is a simplified flow diagram illustrating a device package production final test flow 500, in accord with an embodiment of the present invention. Production test flow 500 incorporates functions occurring in the production tester (e.g. production tester 122) and in the device die incorporated in the production device package 124. The production tester executes a variety of final tests on the device package to ensure that the packaged device is performing within specifications (505). If all tests are not passed within specifications (510), then the package is marked as being bad (515), and testing continues to the next package. If all tests pass (510), then the production tester can trigger the device die within the package to proceed with security-related operations (520).

Upon receiving the trigger from the production tester, a determination is made by the device die as to whether the die is incorporated in a package (525). As discussed above with respect to FIG. 2, in one embodiment, the thickness of the device die is determined and is indicative of whether the device die is incorporated in a package (e.g., below a thickness expected of the device die on a wafer). If the device die is not incorporated within a package, then the security operation aborts (530). By aborting, the security operation prevents a would-be counterfeiter from accessing or programming secure bits of the device die within the package.

If the device die tests out to be incorporated within a package (525), then the device die can transfer the die identifier to the production tester (535). The die identifier is the value that was previously received during wafer testing and stored in the device die's OTP memory, and which uniquely identifies the device die.

Upon receiving the die identifier, the production tester can then retrieve the random number associated with the die identifier from the authentication database (540). As illustrated in FIG. 1, authentication database 170 can be served by data server 150 and accessible to the production tester via network 140. Alternatively, production tester 122 can store an image of the authentication database locally. Once the random number associated with the die identifier has been retrieved, the random number can be transferred to the device die from the production tester (545).

Upon receiving the random number from the production tester, the device die can compare the random number received from the tester to the random numbers stored in the OTP memory of the device die (550). If the random number received from the tester matches the random number stored in the OTP memory, then an activation bit can be set within the OTP memory of the device die (560). At this point, the device die is authenticated for production functionality by, for example, setting a function-enable bit. If the comparison of the random numbers does not result in a match (550), then the security operation will abort to prevent production functionality authorization for the device die.

As discussed above, the security effectiveness of using embodiments of the present invention assumes that a would-be counterfeiter cannot directly program OTP memory bits within the integrated circuit device die. Thus, in order to set the function-enable bit, a counterfeiter would have to execute all of the wafer test and final test operations, because retrieving the random number generated by the device die is only possible during wafer test while programming the function-enable bit is only possible during final test. During each of those stages, the integrated circuit device die self-detects whether it is on a wafer or in a package. This is especially effective in cases of wafer overproduction, wafer theft, and cloning of wafers, where embodiments of the present invention can help to detect and impede device counterfeiting.

For purposes of the present invention, "impeding" means that a counterfeiter will be required to invest significant cost and effort into wafer test and final test, including programming sequences, along with the hardware (e.g., testers) required for such testing. This is in sharp contrast with the low cost and low effort way a counterfeiter prefers to operate (e.g., assembling dies without wafer test and performing simple application tests using an application board with the test socket).

For purposes of the present invention, "detection" means the process of determining if an integrated circuit device die is genuine or not. Detection operations can occur, for example, if governmental customs agencies notices devices which are suspect, or if a customer (e.g., original equipment manufacturer [OEM]) orders integrated circuit device dies from a supplier and wants to know if the supplier got the devices from the original semiconductor manufacturer. The integrated circuit device die or a package incorporating the device die can be analyzed using an authentication tester, similar to the final test and programming procedure, but with a difference of transferring an authentication bit to the tester.

Figure 6:
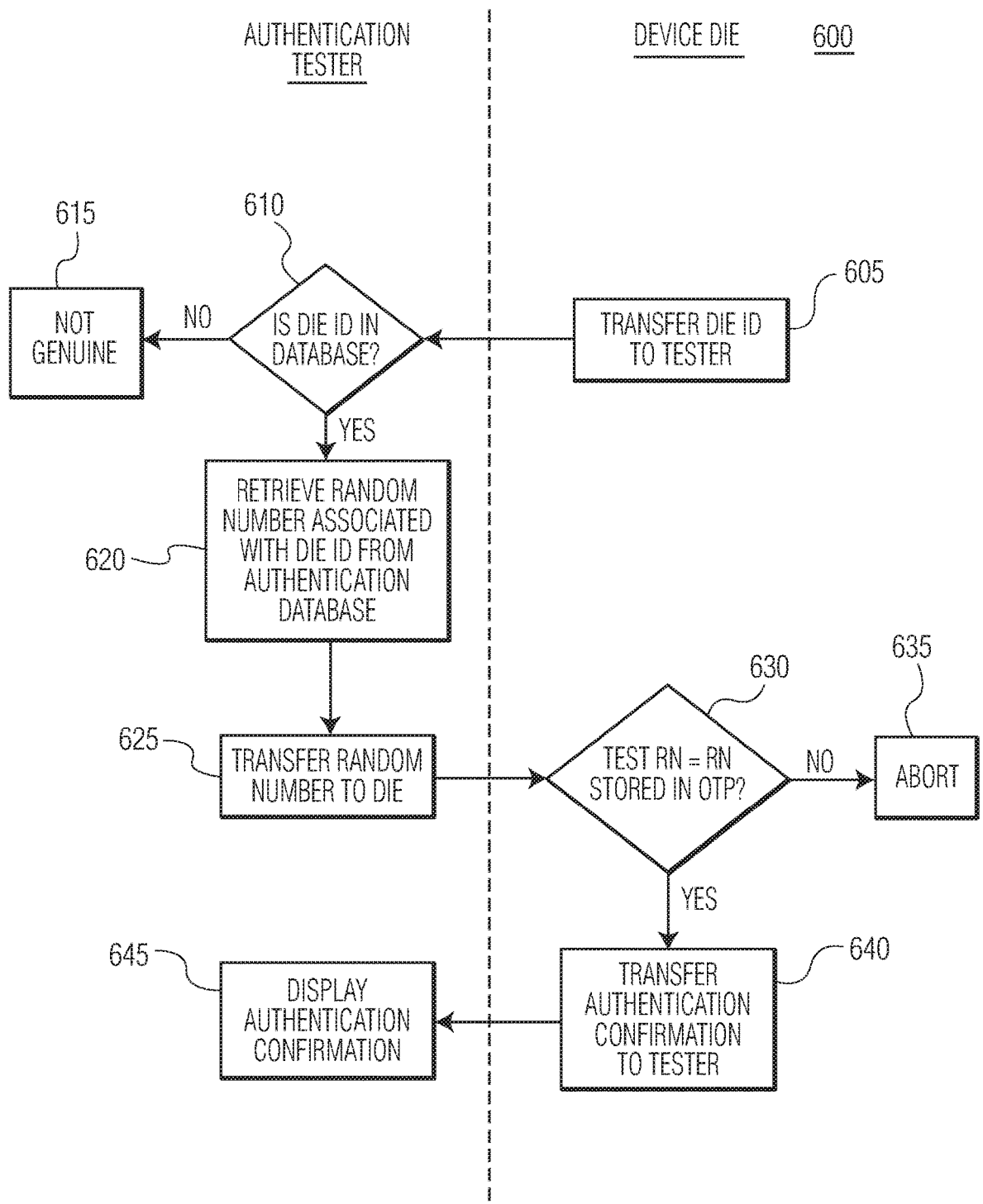
FIG. 6 is a simplified flow diagram illustrating an authentication flow 600, in accord with an embodiment of the present invention.

FIG. 6 is a simplified flow diagram illustrating an authentication flow 600, in accord with an embodiment of the present invention. Authentication flow 600 incorporates functions occurring in an authentication tester (e.g., authentication tester 132) and in the device die incorporated in a device package (e.g., 134).

The device die transfers the stored die identifier to the authentication tester (605). This transfer can occur in response to a query by the authentication tester for the die identifier. The die identifier is the unique number associated with the device die previously stored in the OTP memory of the device die during wafer testing.

Upon receiving the die identifier from the integrated circuit device die, the authentication tester determines if the die identifier is stored in the authentication database (610). As discussed above with respect to production test, authentication database 170 can be accessed by authentication tester 132 by communication with data server 150 through network 140. Alternatively, authentication tester can store a local copy of the authentication database. If the die identifier is not reflected in the authentication database, then a determination is made that the device die is not genuine (615). If the die identifier is stored in the database (610), then the authentication tester can retrieve the random number associated with the die identifier from the authentication database (620). The random number can then be transferred to the device die (625).

Upon receiving the random number from the authentication tester, the device die can compare the tester random number with the random number stored in device dies OTP memory (630). If there is no match, then the authentication fails and aborts (635). If there is a match, then an authentication confirmation can be transmitted by the device die to the authentication tester (640). Such authentication confirmation can be a message of one or more bits providing information desirable by the application. Upon receiving the authentication confirmation, the authentication tester can display the authentication confirmation message or information related to the authentication confirmation message (645).

Figure 7:
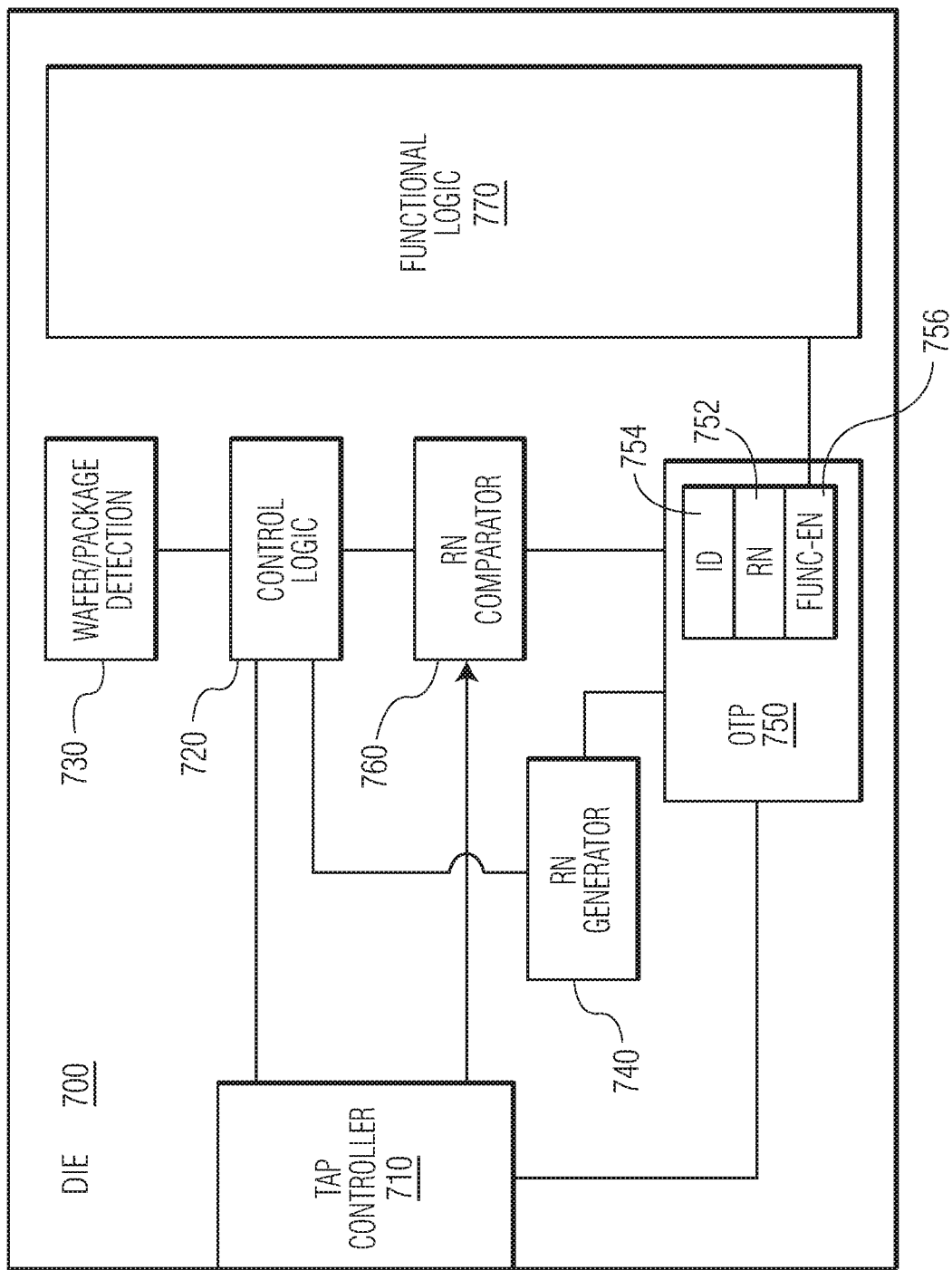
FIG. 7 is a simplified block diagram illustrating an example of functional blocks within a device die 700 usable in accord with embodiments of the present invention.

FIG. 7 is a simplified block diagram illustrating an example of functional blocks within a device die 700 usable in accord with embodiments of the present invention. Integrated circuit device die 700 includes one or more test access port (TAP) controllers 710 by which a tester or other component can communicate with circuitry within the device die. For some testing purposes, taps 710 can include debug and JTAG type communication pads. Taps 710 are communicatively coupled with control logic 720, which can manage the security operations discussed herein. Wafer/package detection circuit 730 is coupled to control logic 720 and is configured to perform operations associated with determining whether the integrated circuit device die is on a wafer or incorporated within a package. In some embodiments, wafer/package detection circuit 730 can incorporate the circuitry and functionality of the device die thickness sensors discussed above with regard to FIG. 2.

Integrated circuit device die 700 further includes a random number generator 740 configured to generate a true random number to enable embodiments of the present invention. Random number generator 740 can store the random number in a random number register 752 of one-time programmable (OTP) memory 750. OTP 750 can include additional registers, such as device die identifier register 754, which is configured to store the unique device die identifier supplied by a wafer tester. In addition, OTP memory 750 can store a function-enable bit 756, which can allow functional logic 770 of device die 700 to function during normal operation.

There is circuit device die 700 can also include a random number comparator 760, which is configured to perform comparisons between a random number supplied by a tester (e.g. production tester 122 or authentication tester 132) and the value stored in random number register 752. Results of such comparison can be provided to control logic 724 security decision-making purposes, as discussed above.

By now it should be appreciated that there has been provided a method for authenticating integrated circuit device die. The method includes a wafer test stage and a package test stage. The wafer test stage includes determining, by the integrated circuit device die, whether the IC device die is on a wafer, storing identifying information on the IC device die if the IC device die is on the wafer where the identifying information uniquely identifies the IC device die, and aborting the wafer test stage is the IC device die is not on the wafer. The package test stage includes determining, by the IC device die, whether the IC device die is incorporated in a package, determining if information stored on the IC device die corresponds to an authentic device if the IC device die is incorporated in the package, and aborting the package test stage if the IC device die is not incorporated in a package.

In one aspect of the above embodiment, determining if information stored on the IC device die corresponds to an authentic device during the package test stage further includes comparing a first value stored on the IC device die with an authentication value provided by a first external node where the information stored on the IC device die includes the first value, and setting a function-enable bit if the comparing results in a match. In a further aspect, the information stored on the IC device die includes the identifying information stored during the wafer test stage, and the first value includes a random number generated during the wafer test stage. In another further aspect, the package test stage further includes transferring a second value to the first external node where the information stored on the IC device die further includes the second value, and receiving the authentication value from the external node in response to transferring the second value. In a still further aspect, the second value includes a die identifier value provided to the IC device die during the wafer test stage.

In another aspect of the above embodiment, the first external node is a package tester. In yet another aspect of the above embodiment, setting the function-enable bit configures the IC device died perform functional operations.

Another aspect of the above embodiment, the wafer test stage further includes generating a random number on the IC device die where the identifying information includes the random number. In a further aspect, the method further includes transmitting, by the IC device die, the random number to a second external node, and receiving, by the IC device die, a unique die identifier from the second external node in response to transmitting the random number where the identifying information further includes the unique die identifier. In a still further aspect, the second external node includes a wafer tester.

In another aspect of the above embodiment, determining whether the IC device die is on a wafer and determining whether the IC device die is incorporated in a package includes determining a thickness of a semiconductor substrate included in the IC device die. In a further aspect, determining the thickness of the semiconductor substrate includes producing an electrical charge in the semiconductor substrate using a charge emitter embedded in the semiconductor substrate, and generating a response signal in response to the electrical charge produced in the semiconductor substrate using a charge sensor embedded in the semiconductor substrate where a magnitude of the response signal depends on a thickness of the semiconductor substrate.

Another embodiment of the present invention provides a system for authenticating integrated circuit device die. The system includes a wafer tester and a package tester. The wafer tester is configured to receive a semiconductor wafer including the IC device die, execute production wafer tests on the IC device die, trigger the IC device died perform an on-wafer authentication stage of all production wafer tests pass, receive a first value from the IC device die, associate the die identifier with the IC device die, store a die identification pair including the die identifier and the first value, and transmit the die identifier to the IC device die. The on-wafer authentication stage includes the IC device die determining whether the IC device die is on the wafer. The package tester is configured to receive a packaged device including the IC device die, execute final tests on the packaged device, trigger the IC device die to perform an in-package authentication stage if all final tests pass, receive a second value from the IC device die, determine whether the second value matches the die identifier, and transmit to the IC device die a third value associated with the die identifier if the second value matches the die identifier. The in-package authentication stage includes the IC device die determining whether the IC device die is in a package. The device die authenticates for functionality if the third value matches the first value.

In one aspect of the above embodiment, the system further includes a data server coupled to the wafer tester and the production tester via a network. The data server is configured to store an authentication database including the die identification pair. In a further aspect, the system further includes an authentication tester coupled to the data server and configured to receive the die identifier from the IC device die, compare the die identifier with entries in the authentication database, provide an associated value from the die identification pair including a match to the die identifier to the IC device die, and receive an authentication confirmation from the IC device die.

Another embodiment of the present invention provides an integrated circuit device die that includes: a communication interface configured to transmit and receive signals from a node external to the IC device die; a wafer/package detection circuit configured to determine whether the integrated circuit device die is on a wafer or incorporated in a package in response to a signal from the node external to the IC device die; a random number generator logic, coupled to the wafer/package detection circuit, and configured to generate a true random number in response to the wafer/package detection circuit determining that the IC device die is on a wafer; and a one-time programmable memory, coupled to the random number generator, and configured to store the true random number and a unique die identifier received from a node external to the IC device die.

In a further aspect of the above embodiment, the IC device die further includes a comparator logic coupled to the OTP memory and the communication interface, and a control logic configured to set a function-enable bit in the OTP memory. The comparator logic is configured to compare the true random number with a value received from the node external to the IC device die. The function-enable bit enables functional logic on the IC device die to operate in a device package. In another further aspect of the above embodiment, the wafer/package detection circuit determines whether the IC device dies on a wafer or incorporated in a package by being configured to measure a thickness of a semiconductor substrate of the IC device die. In still a further aspect, the wafer/package detection circuit includes a charge emitter embedded in the semiconductor substrate of the IC device die and is configured to produce an electric charge in the semiconductor substrate, and a charge sensor embedded in the semiconductor substrate and configured to generate a response signal in response to the electrical charge produced in the semiconductor substrate where a magnitude of the response signal is in response to the thickness of the semiconductor substrate. In yet a further aspect of the above embodiment, the charge emitter is configured to generate light radiated into the semiconductor substrate.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from local computer readable media or other media on other computer systems (e.g., memory 160). Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100 can incorporate computer systems such as a personal computer system. Other embodiments may include different types of computer systems or processors. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit device die comprising:
 a communication interface configured to transmit and receive signals from a node external to the integrated circuit (IC) device die;
 a wafer/package detection circuit configured to determine whether the IC device die is on a wafer or incorporated in a package in response to a signal from the node external to the IC device die;
 a random number generator logic, coupled to the wafer/package detection circuit, and configured to generate a true random number in response to the wafer/package detection circuit determining that the IC device die is on a wafer; and a one-time programmable (OTP) memory, coupled to the random number generator, and configured to store the true random number and a unique die identifier received from a node external to the IC device die.

2. The IC device die of claim 1 further comprising:
a comparator logic, coupled to the OTP memory and the communication interface, and configured to compare the true random number with a value received from the node external to the IC device die; and
a control logic configured to set a function-enable bit in the OTP memory, wherein the function-enable bit enables functional logic on the IC device die to operate in a device package.

3. The IC device die of claim 1 wherein the wafer/package detection circuit determines whether the IC device die is on a wafer or incorporated in a package by being configured to measure a thickness of a semiconductor substrate of the IC device die.

4. The IC device die of claim 1 wherein the wafer/package detection circuit comprises:
a charge emitter embedded in the semiconductor substrate of the IC device die and is configured to produce an electric charge in the semiconductor substrate; and
a charge sensor embedded in the semiconductor substrate and configured to generate a response signal in response to the electrical charge produced in the semiconductor substrate, wherein a magnitude of the response signal is in response to the thickness of the semiconductor substrate.

5. The IC device die of claim 4 wherein the charge emitter is configured to generate light radiated into the semiconductor substrate.

* * * * *